United States Patent [19]
Jouin et al.

[11] Patent Number: 5,778,321
[45] Date of Patent: Jul. 7, 1998

[54] PROCEDURE FOR AUTOMATICALLY REPLACING A USER IDENTIFICATION MODULE IN A MOBILE TERMINAL IN AN MOBILE RADIO NETWORK

[75] Inventors: Christophe Jouin; Eric Desblancs, both of Paris, France

[73] Assignee: Alcatel Mobile Communication France, Paris, France

[21] Appl. No.: 423,633

[22] Filed: Apr. 17, 1995

[30] Foreign Application Priority Data

Apr. 29, 1994 [FR] France ................... 94 05256

[51] Int. Cl.$^6$ ................... H04B 1/38; H04M 1/00
[52] U.S. Cl. ................ 455/558; 455/575; 455/425
[58] Field of Search .................. 455/33.1, 54.2, 455/67.7, 67.1, 54.1, 558, 514, 551, 575, 552, 425; 379/59, 57, 357

[56] References Cited

U.S. PATENT DOCUMENTS

| | | | |
|---|---|---|---|
| 5,297,193 | 3/1994 | Bouix et al. | 379/63 |
| 5,418,837 | 5/1995 | Johansson et al. | 379/58 |
| 5,507,009 | 4/1996 | Grube et al. | 455/54.1 |
| 5,519,758 | 5/1996 | Tabbane | 455/558 |
| 5,524,276 | 6/1996 | Littig et al. | 455/551 |
| 5,687,216 | 11/1997 | Svensson | 455/558 |

FOREIGN PATENT DOCUMENTS

| | | |
|---|---|---|
| 0481714A2 | 4/1992 | European Pat. Off. . |
| 0546614A1 | 6/1993 | European Pat. Off. . |

OTHER PUBLICATIONS

French Search Report FR 9405256.
Echo Des Recherches, No. 139, Ilsy /Moulineaux, Fr, pp. 13-20, Jolie et al, "Une application de la ca microprocessor: Le module d'identite d'abonne du radiotelepohone numique europeen", Mar. 31, 1990.

*Primary Examiner*—Reinhard J. Eisenzopf
*Assistant Examiner*—Darnell R. Armstrong
*Attorney, Agent, or Firm*—Sughrue, Mion, Zinn, Macpeak & Seas, PLLC

[57] ABSTRACT

A procedure for automatically replacing a user identification module of a terminal in a communication network includes storing in a memory of the terminal a message indicating the detection of a problem with writing and/or reading the user identification module. A warning message is sent from the terminal to a control station of the terminal during the first exchange of information following detection of the problem. A database listing defective identification modules is updated at the control station. A procedure for sending a new identification module to the user of the terminal is initialized.

11 Claims, 1 Drawing Sheet

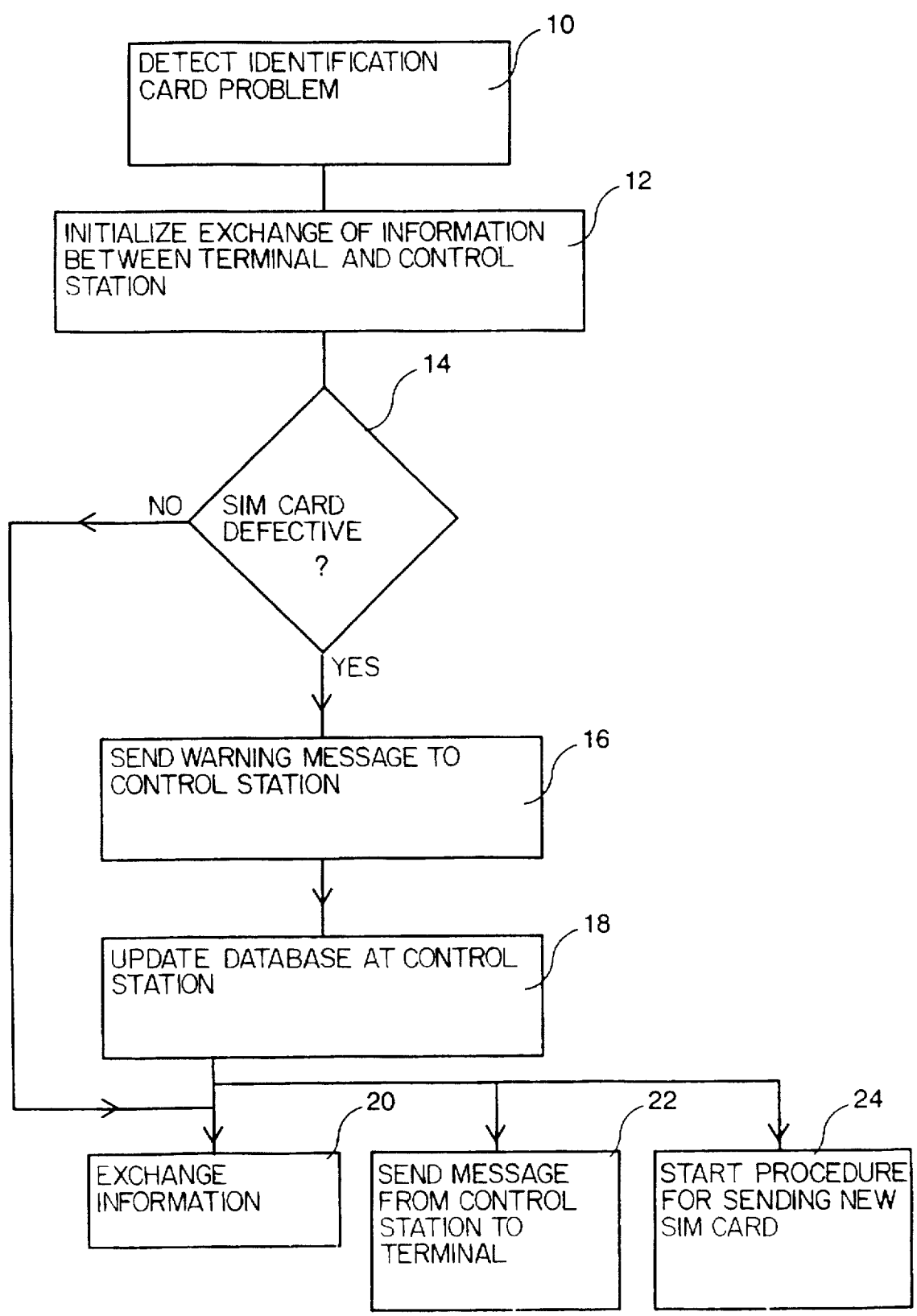

PROCEDURE FOR AUTOMATICALLY REPLACING A USER IDENTIFICATION MODULE IN A MOBILE TERMINAL IN AN MOBILE RADIO NETWORK

BACKGROUND OF THE INVENTION

1. Field of the Invention

The present invention concerns mobile radio systems in general and in particular a procedure for automatically replacing a user identification module of a mobile terminal in a communication network such as a GSM network if the identification module is defective.

2. Description of the Prior Art

In a GSM or DCS type mobile radio network each user has an identification (SIM) card which, in addition to identifying the user, contains other information such as the user's personal telephone directory, message encryption codes, etc. The identification card is usually a smart card (SIM card).

Unfortunately, these smart cards have a limited life and after a time problems may occur in reading or writing the card. In a GSM or DCS network there is a procedure for advising the terminal that a problem has been detected (GSM Recommendation 11.11). The warning message can be:

- read or write executed after X attempts; this message indicates wear of the SIM card which will soon need to be replaced,
- read or write impossible; this message indicates that the SIM card must be replaced, and in this case the terminal can use a default value for the information which is inaccessible.

At present, whenever possible, the terminal goes to a degraded mode and operates with default values after receiving the message indicating that the SIM card is defective. This mode of operation gives rise to problems for the network operator (unnecessary use of dedicated resources) and for the user (loss of information such as stored telephone numbers or loss of access to certain functions).

For example, the location of the terminal is backed up by an area identifier in the SIM card so that it does not have to be determined again while the terminal is in this area. Also, the period at which the terminal has to determine its location is stored in the SIM card and a defect preventing access to this information prevents this periodic determination of the location of the terminal.

The above problems caused by a defective SIM card are difficult to deal with as at present the only option is for customers to return their SIM card.

For this reason an object of the invention is to provide a procedure enabling the network to replace a defective user identification card without the user having to decide to replace it.

SUMMARY OF THE INVENTION

The invention consists in a procedure for automatically replacing a user identification module of a terminal in a communication network, the procedure including the following steps: storing in a memory of the terminal a message indicating the detection of a problem writing and/or reading the user identification module, transmitting a warning message from said terminal to a control station of said terminal during the first exchange of information following detection of the problem, updating a database listing defective identification modules at said control station, and initializing a procedure for sending a new identification module to the user of said terminal.

The aims, objects and features of the present invention will be better understood from a reading of the following description given with reference to the single figure which represents a flowchart of the procedure of the invention.

BRIEF DESCRIPTION OF DRAWING

FIG. 1 is flowchart of a procedure for automatically replacing a user identification module in a mobile terminal in a mobile network

DETAILED DESCRIPTION OF THE PREFERRED EMBODIMENT

It is assumed hereinafter that the mobile terminal is part of a GSM or DCS mobile radio network and that each user has an identification (SIM) card which has to be inserted into the terminal each time he or she wishes to make a telephone call. However, it is obvious that a card of this kind could be replaced by any other type of removable identifying module without departing from the scope of the invention.

SIM cards are smart cards which may become difficult to write and/or read after being in use for some time. As soon as the terminal detects a problem an indication of the problem is stored in the memory of the terminal pending an exchange of information between the terminal and the network (10).

The next time the mobile terminal is switched on, or at the time of the next telephone call, or the next time the terminal has to determine its location, information is exchanged between the terminal and the network via the base transceiver station (12). At this time the terminal consults its memory to confirm that the SIM card is defective (14). If so, a warning message is transmitted to the network via the base transceiver station (16). In the GSM or DCS network the base transceiver station transfers the message to the mobile services switching center (MSC) to update a database listing all defective SIM cards (18).

If the SIM card is defective, this exchange of information can take place once these operations have been completed (20). If the SIM card is not defective, then the exchange of information takes place immediately.

After updating the defective identification card database, the network undertakes two operations which are essential to the procedure of the invention. A short message (SMS) is transmitted by the base transceiver station to the terminal to advise the latter that a new SIM card will be sent to the user (22) and at the same time the switching center, after consulting its database, initializes the procedure for sending out a new card to the user (24).

The procedure as described above can be varied and improved without departing from the scope of the invention. For example, a warning message could be transmitted from the terminal to the base transceiver station immediately after detecting the problem. However, this would utilize significant resources which would not be justified in that the next opportunity to send the message occurs soon after detection of the problem.

Likewise, provision may be made for a message to be shown on the display of the terminal as soon as a problem is detected to tell the user that the program is now operating in degraded mode and not all functions are now available.

In conclusion, the procedure just described offers a number of advantages in terms of network operation such as improved service to the user, controlled management of the installed base of SIM cards, anticipation of more serious SIM card problems which could otherwise render the terminal unusable (with attendant customer dissatisfaction), and a reduction in the time for which the terminal operates in degraded mode.

Although the invention has been described with reference to a GSM or DCS type mobile radio network, it will be obvious to the person skilled in the art that the invention can be applied to any type of communication network and the associated user identification modules.

There is claimed:

1. Procedure for automatically replacing a user identification module of a terminal in a communication network, said procedure including the following steps:

storing in a memory of said terminal a message indicating the detection of a problem writing and/or reading said user identification module, transmitting a warning message from said terminal to a control station of said terminal during the first exchange of information following detection of said problem, updating a database listing defective identification modules at said control station, and initializing a procedure for sending a new identification module to the user of said terminal.

2. Procedure according to claim 1 wherein a warning message is displayed on a screen of said terminal immediately after said problem writing and/or reading said identification module is detected.

3. Procedure according to claim 1 wherein said control station when advised of said problem transmits in return a message for display on a screen of said terminal advising the user that a procedure for replacing said identification module has been started.

4. Procedure according to claim 1 wherein said communication network is a GSM or DCS network, said terminal is a mobile terminal and said user identification module is an SIM card.

5. A method for automatically providing a user with a replacement for a defective module of a terminal in a communication network, said method comprising the steps of:

storing a module fault detection indicator in a memory of said terminal, transmitting a warning signal from said terminal to a service collection point, updating a list of module fault detection indications, and initiating a procedure for sending a replacement module to said user.

6. The method of claim 5 in which said warning signal is transmitted from a terminal to a control station of said terminal during the first exchange of information following said storing of said module fault detection indicator in said memory.

7. The method of claim 5 in which said list of module fault detection indicators is part of a database.

8. The method of claim 5 in which said module fault indication arises when said terminal has difficulties communicating with said module when said module is installed in said terminal.

9. The method of claim 5 in which said service collection point returns a message to said terminal indicating that said procedure for sending a replacement module has been initiated.

10. The method of claim 9 in which an indication of receipt of said message is presented to said user.

11. The method of claim 5 in which said communication network is a GSM or DCS network and said module is a SIM card.

* * * * *